(12) United States Patent
Lopez et al.

(10) Patent No.: US 6,200,118 B1
(45) Date of Patent: Mar. 13, 2001

(54) MOLD AND MOLDING ELEMENT FOR MOLDING AN INCISION IN A RUBBER ARTICLE

(75) Inventors: José Merino Lopez, Riom; Jean Claude Kaczorwski, Malauzat; Pascal Auxerre, Royat, all of (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/335,569

(22) Filed: Jun. 18, 1999

(30) Foreign Application Priority Data

Jul. 3, 1998 (FR) .................................................. 98/08653

(51) Int. Cl.$^7$ .................................................. B29D 30/68
(52) U.S. Cl. ............................................ 425/28.1; 425/46
(58) Field of Search ................................ 425/28.1, 35, 46

(56) References Cited

U.S. PATENT DOCUMENTS

| | | | |
|---|---|---|---|
| 3,199,567 | * 8/1965 | Kunz et al. | 425/46 |
| 3,328,849 | * 7/1967 | Kunz et al. | 425/28.1 |
| 3,608,602 | * 9/1971 | Youngblood | 425/28.1 |
| 3,692,090 | * 9/1972 | Brobeck et al. | 425/46 |
| 4,154,564 | * 5/1979 | French | 425/46 |
| 4,303,115 | * 12/1981 | Flechtner et al. | 425/46 |
| 4,598,747 | * 7/1986 | Flechtner | 425/28.1 |
| 4,994,126 | 2/1991 | Lagnier | 152/209 R |
| 5,558,887 | 9/1996 | Skufca et al. | 425/418 |
| 6,026,875 | * 2/2000 | Diensthuber et al. | 425/46 |

FOREIGN PATENT DOCUMENTS

| | | |
|---|---|---|
| 19506697 | 8/1996 | (DE) . |
| 0774307 | 5/1997 | (EP) . |
| 0816687 | 1/1998 | (EP) . |
| 2722145 | 1/1996 | (FR) . |

OTHER PUBLICATIONS

Patent Abstracts of Japan, vol. 014, No. 491 (M–1040), JP 02200414, title: Mold Apparatus for Injection molding of screw (Pentel KK) publication date Aug. 8, 1990, Abstract only.

* cited by examiner

Primary Examiner—James P. Mackey
(74) Attorney, Agent, or Firm—Baker Botts L.L.P.

(57) ABSTRACT

A molding element designed to mold a cut in a rubber article, such as a tire, and in which the cut has a geometry of rotation on an axis XX'. The molding element has a head extended by a molding part intended to project into the molded surface in order to mold at least one cut in the rubber article. The head is mounted for rotation in a mold member, and the head contains at least one circular cylinder of axis XX' defining the main axis of the molding element, and cooperates with mold member in order to permit a rotation on XX' relative to the mold, when the molding part of the molding element is subjected either to a force acting in direction XX' or to a torque about the same direction XX'.

19 Claims, 3 Drawing Sheets

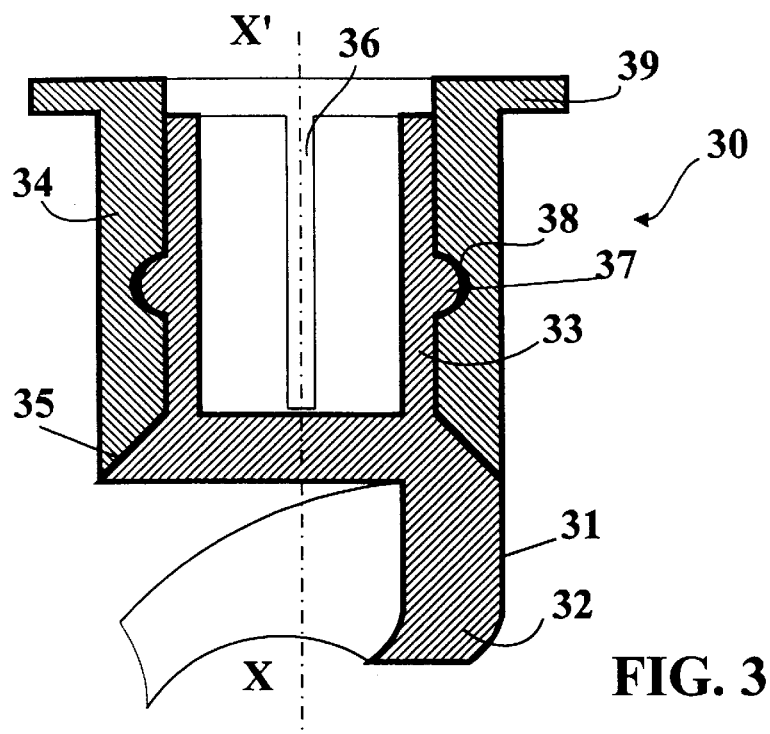
FIG. 3
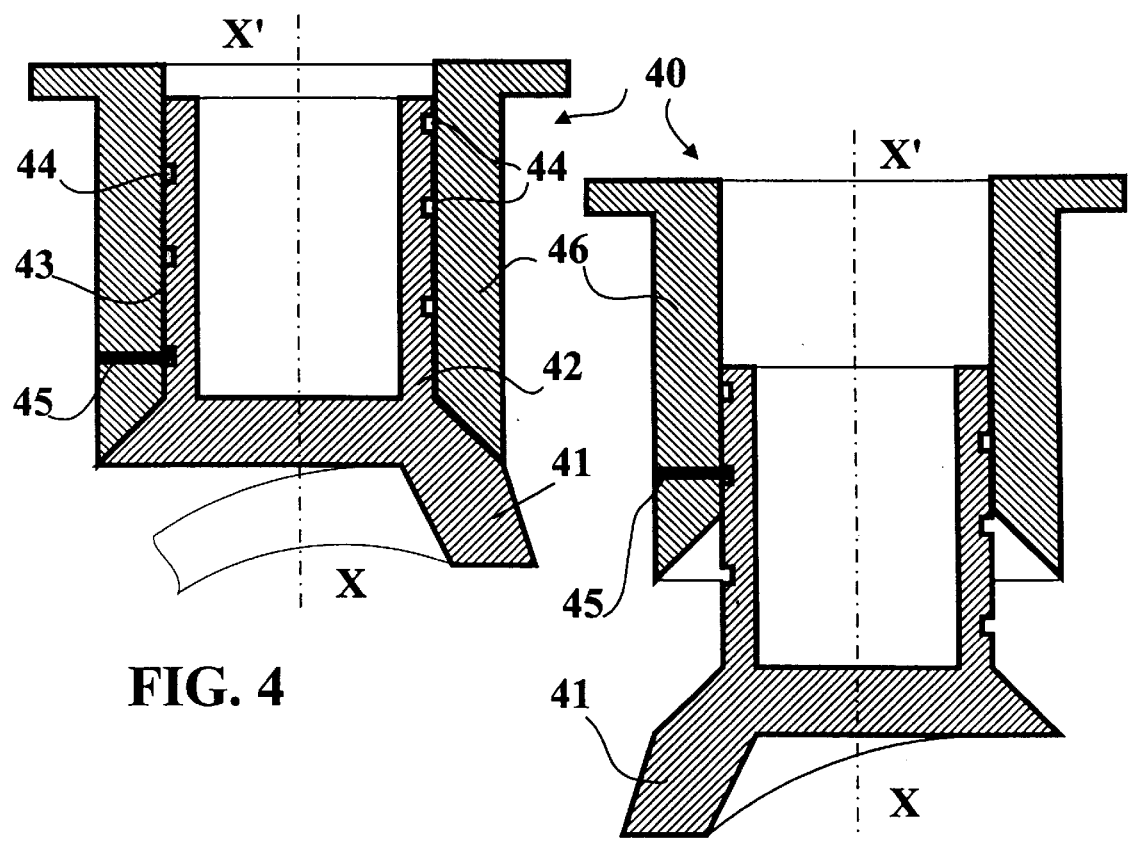
FIG. 4
FIG. 5

MOLD AND MOLDING ELEMENT FOR MOLDING AN INCISION IN A RUBBER ARTICLE

BACKGROUND OF THE INVENTION

The invention concerns a mold for molding a tire, said mold containing at least one molding element designed to mold a cut in said tire; this invention also concerns a molding element designed to mold a cut in a tire.

In order to mold a cut in a tire tread, a mold made up of a plurality of mold members is ordinarily used, each of said members being able to contain a plurality of molding elements projecting on the molding surface of said mold members. The term "cut" is understood to embrace grooves (at least 3 mm wide) as well as incisions (that is, grooves less than 3 mm wide).

A molding element generally contains two parts: a first part forming the molding part of the molding element projects on the molding surface of the mold, and a second part situated in the extension of the first is anchored in the mold. The anchorage of said second part is, for example, for a mold made by casting, obtained at the time of casting of the material constituting said mold, said material trapping said second part of the molding element during the phase of cooling of said material.

During molding and vulcanization of the tire, the molding part of the molding element is sunk inside the rubbery material constituting the tire in order to form a cut. After vulcanization of the tire, the components of the mold are moved in their proper mold stripping direction and gradually separate from one another so as to release the molded tire by carrying the mold elements along with them to extract them from the tire.

Producing a tire having durable rolling performances can be accomplished by the use of incisions, the geometry and/or mean orientation of which appreciably evolve(s) with wear of the tire tread. However, when such incisions are molded, usually by means of rigid molding elements, the mold stripping of said elements is sometimes very difficult (for it necessitates a force that increases with the number of molding elements of this type), and is even impossible without risking damage to the tire (by tearing away rubber compound parts).

For example, French Application 2,722,145 discloses a tread containing a plurality of elements in relief, some of them being provided with incisions, whose mean direction on the rolling surface gradually changes with the wear of said tread. As soon as the change of orientation becomes great, it is clear that obtaining such an incision by means of a molding element containing a rigid wire forming the molding part of the same geometry is difficult, at least in the mold stripping phase (that is, of extraction of said molding element). The term "wire" is understood to embrace blades.

The same is true when a molding element contains at least one rigid wire having a helical or twisted shape or any geometry entailing the existence of a torque resulting from torsion being exerted on the molding part during mold stripping. In order not to damage the appearance of the tread during said mold stripping operation, the use of this type of element necessitates particular precautions usually incompatible with the demands of industrial production.

SUMMARY OF THE INVENTION

To overcome these difficulties, a mold is proposed for molding a tire tread, said mold being formed by a plurality of members, each mold member comprising a molding surface for molding a part of the surface of said tread and being movable in a molding/mold stripping direction.

In addition, at least one mold member is provided with at least one molding element for molding at least one incision in said tread, said molding element embodying two parts situated, one an extension of the other, a first part forming the molding part of the molding element and projecting on the molding surface in order to mold said incision in the tread and a second part rotatable about an axis XX', merged with the direction of molding/mold stripping of the mold member, and intended to be mounted in a seat provided in the mold member.

The mold member is characterized in that it is provided with means of mounting and fastening the second part of the molding element in the seat provided in the mold, said mounting means allowing rotation of the molding element on its axis XX' during at least the mold stripping phase.

The first part of the molding element is intended to mold at least one incision in the tire; for that purpose, it contains at least one wire, the geometry of which is such that during mold stripping, the contact forces of the rubber surrounding said first part create a resultant torque about the main direction XX' of the element tending to turn said molding element on XX'. The free rotary mounting of said molding element makes possible and facilitates extraction of the molding part from the molding element out of the tire during mold stripping.

A variant embodiment consists of mounting the second part of the molding element in free rotation on a cylinder-shaped base, said base being arranged in turn to be rigidly mounted in rotation in a seat provided in a mold member. This arrangement makes it possible to avoid wear of the mold member created by friction with the rotary moving part of the molding element.

It can advantageously be arranged to combine a relative rotary motion of the molding element in relation to the mold and a translational motion of the same molding element in relation to the mold, in order to facilitate penetration and/or extraction of the molding part in or out of the rubber. For this purpose, a generally cylinder-shaped seat of main axis XX' is provided for receiving a molding element whose part inserted inside the seat is capable of turning about said direction XX'; in addition, means are provided for moving said molding element in direction XX' in said seat. Complementary means can also be provided to ensure a given position of the molding element in the molding configuration.

It is also of interest to arrange for the presence of means of rotation before or during the operation of molding and/or mold stripping, whether or not there is a possibility of displacement of the molding element in its seat; this rotation can advantageously be synchronized with displacement of the element along XX' (corresponding to the mold stripping movement of the mold member and/or to the movement inside the seat of the molding element).

In known manner, the molding elements used to mold cuts in a tire are formed either directly on the mold used for molding said tire during manufacture of the mold, or formed separately and slipped on the mold during its manufacture or afterwards. The method of manufacture of molds and that of molding of tires limit the possibilities of molding shapes of cuts to shapes that can be stripped from the mold without cutting or tearing away the rubber compound after its vulcanization.

Molding elements making it possible to mold unstrippable incisions (that is, containing undercut parts) are known, for example, from French Patent Application No. 97/05194; however, the use of such molding elements demands a deformation of the molding part during mold stripping, which deformation can become permanent after a more or less large number of moldings.

To remedy these problems, a molding element is proposed to equip a mold member molding a rubber compound article like a tire or tractor tread in order to make at least one incision in said tread, which mold member can be driven in a molding and/ or mold stripping motion in a predetermined direction. The molding element according to the invention is characterized in that it comprises:

a body equipped with a head extended by a molding part, said molding part being intended to project on the molding surface of the mold member in order to mold at least one incision in the tread;

the head containing at least one circular cylinder of axis XX' defining the main axis of the molding element, and means of mounting said molding element in the mold member, said means cooperating with said member in order to permit a rotation of the head about XX' relative to the mold, when the molding part of the molding element is subjected either to a force acting in direction XX' or to a torque about the same direction XX', while ensuring retaining of the molding element in direction XX'.

As soon as the molding part of the molding element according to the invention contains at least one wire fastened to the head of said element at one of its ends and extending in a direction forming at least locally a nonzero angle with direction XX', said molding part is subjected, in the course of mold stripping, to forces exerted by the rubber compound, the resultant of which is translated by a torque acting about direction XX'. Under this action, the molding element turns about its axis XX' and thus makes mold stripping possible without degrading the molded and vulcanized tread.

This molding element makes possible an incision that is offhand unstrippable, that is, the geometry of whose molding part has at least partially a helical or twisted shape. Partially is understood to mean that the incision follows a helical profile over only part of its length.

One embodiment of a molding element making it possible to obtain a mold according to the invention consists of providing said element with means of mounting and fastening said molding element on the mold member, these mounting means comprising a cylinder-shaped base concentric to the head of the molding element, said base being intended to be installed and fastened locked in rotation in a seat provided in a mold member bearing said molding element. This base is designed to cooperate with the head of the molding element in order to permit the rotation of said head relative to said base and, consequently, relative to the mold member bearing the molding element.

The molding element according to the invention solves the problem raised in the case of a helical geometry that is offhand difficult if not impossible to strip from the mold; under the effect of displacement of the mold part bearing the molding element according to the invention, the resulting mechanical action of the rubber compounds surrounding said molding element on the latter produces a rotation of the molding element about the main direction of said element (roughly perpendicular to the molding surface of the mold or in a direction slightly inclined from that surface, that is, by an angle at most equal to 15°).

The mold and the molding element according to the invention will be better understood by the description of several working variants given without limitation and described by making reference to the figures.

DESCRIPTION OF THE DRAWINGS

FIG. 3 shows a section of a molding element according to the invention containing a cylindrical head mounted in free rotation inside a cylindrical base, said base being arranged to be fastened in a mold;

FIG. 4 shows a section of a variant of a molding element according to the invention, the cylindrical head of which, mounted in free rotation inside a cylindrical base, can also be moved in the axial direction XX' of said base;

FIG. 5 shows a section of the variant of the molding element shown in FIG. 4 in mold stripping position;

DESCRIPTION OF PREFERRED EMBODIMENTS

Figure 1:
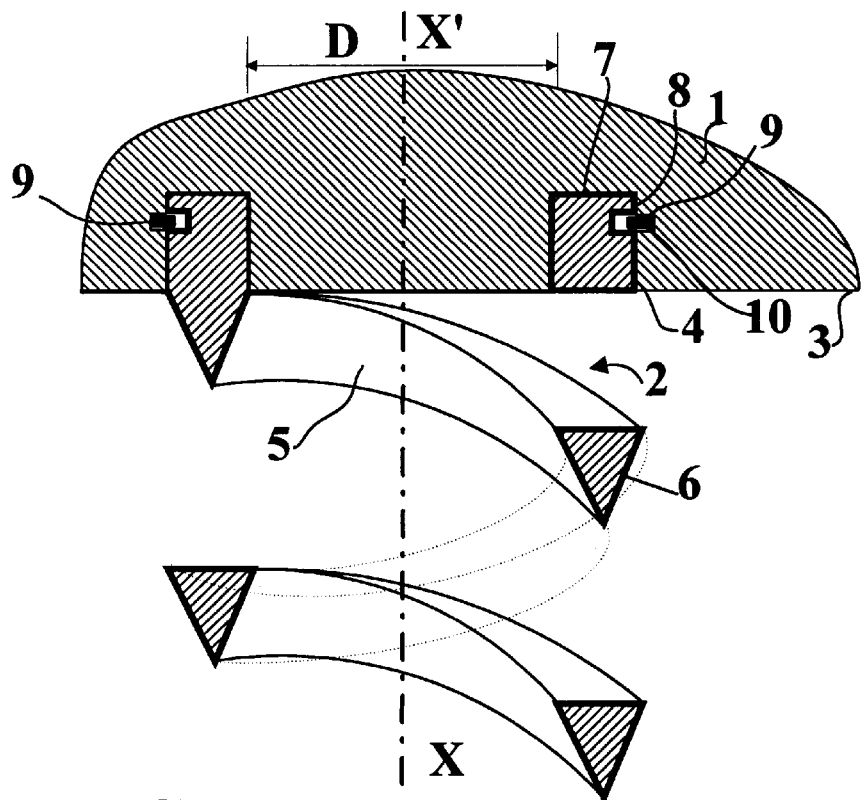
FIG. 1 shows a partial view in section of a mold member for molding a part of a tire tread containing a cylinder-shaped molding element of axis XX' mounted on said mold member in free rotation about XX' in a seat in the form of a circular groove.

FIG. 1 shows a partial section of a mold member 1 of a tire tread, on which is mounted a molding element 2 intended to mold an incision in the average shape of a helix of axis XX'. The mold member 1 represented contains a molding surface 3 intended to mold a part of the rolling surface of a tire tread; in the mold member 1 and passing out on said surface 3, a cylindrical groove 4 of axis XX' is made (by molding or by machining) and whose trace on the molding surface is circular and of inner diameter D. In the plan in the figure, the groove 4 represents an overall rectangular cross section.

The molding element 2 is composed of a cylindrical head 7 intended to be installed inside the groove 4, said head 7 being extended by a molding part 5 containing a single wire 6 of triangular cross section and forming a helical part about XX'. The molding element is made of a material, such as metal, having sufficient rigidity to penetrate the raw rubber during molding.

In addition, fastening means 10 projecting on the outer wall surface of the head 7 of the molding element 2 are provided to cooperate with a groove 9 made on the wall 8 of the groove 4 serving as seat for the molding element farthest from axis XX'. Said means 10, represented schematically, exert elastic forces directed radially outward relative to axis XX' and make possible the mounting of the molding element 2, while leaving the rotation of said molding element free in its seat.

During the mold stripping after vulcanization, the rubber, enveloping the wire 6, exerts reaction forces on said wire 6, creating a torque on XX'; under the effect of that torque, the molding element 2 is forced to turn in its seat 4 on XX'; in that way, the wire, by following the geometry of the molded incision, is able to unwind out of the rubber without damaging the molded tread.

Figure 2:
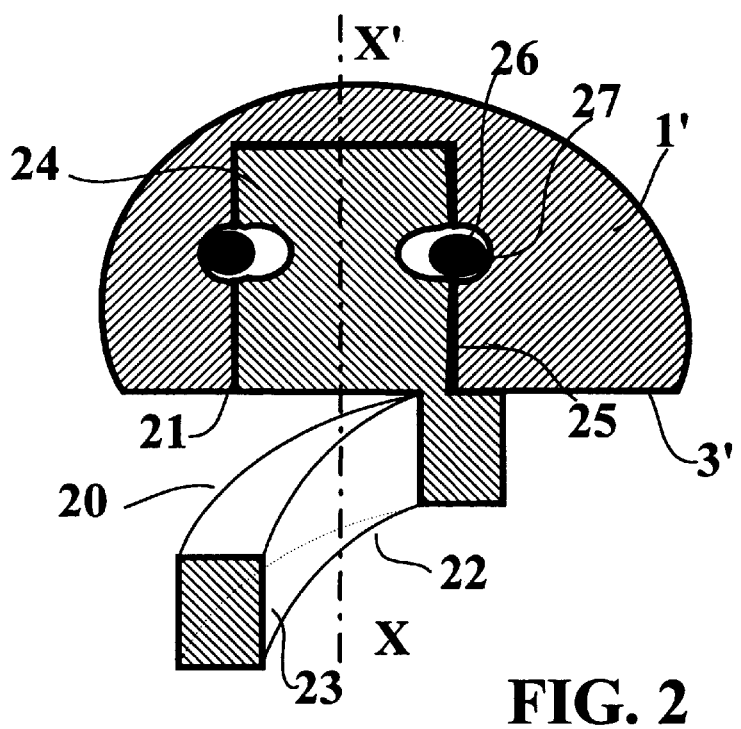
FIG. 2 shows a section of a mold provided with a seat in the form of a cylindrical hole inside which is installed the head of a molding element that can turn on its axis XX'.

In another mold variant according to the invention, a partial section of which is represented in FIG. 2, the seat 21 provided on the mold to receive a molding element 20 has the shape of a cylindrical hole of axis XX' perpendicular to the molding surface 3' of the mold member. Of course, it is possible to envisage making generally cylinder-shaped seats of axis forming an angle different from 90° with the molding surface of the mold member considered, so as to be able to mold a cut, whose mean axis is inclined relative to the perpendicular to the molding surface; in that case, it is desirable to provide an angle equal to or slightly different from that made by the mold stripping direction of the mold member considered.

The body of the molding element 20 consists of a molding part 22 formed by a blade 23 of rectangular section and helix-wound on XX', said molding part 22 extending a circular cylinder-shaped head 24, the dimensions of which are suitable for being placed inside the seat 21 with appropriate clearance for making placement and rotation possible and also reducing the rubber penetration between said head and the wall of the seat as much as possible.

Similar to what was described for the embodiment shown in FIG. 1, means of fastening 26 (a circlip, for example) are provided on the head 24 of the molding element, which make possible the insertion of said head in its seat 21 and which, once in place, cooperate with a circular groove 27 made on the wall 25 of said seat.

What has just been described with a wire can be generalized in the case of a molding element having a molding part containing a plurality of wires, each forming a helix and said wires being parallel to each other in order to obtain a rotation of the molding element during mold stripping.

The helix described by each wire can advantageously be inscribed on a truncated cone so as to obtain a progressive evolution of the sculpture of a tire tread with the wear of said tread; the virtual truncated cone on which each wire is coiled tangent to its smaller diameter base situated as close as possible to the head of the molding element (that is, as close as possible to the molding surface of the mold bearing said molding element) and the angle of the truncated cone is preferably between 0° and 20°. With this type of molding element, it is possible to arrange a plurality of molding elements, whose distance separating the centers of the circles of the narrow bases is less than the distance of the centers of the wide bases, so as somehow to obtain an interweaving of the molding parts with one another.

One particular embodiment of a molding element 30 according to the invention is represented in FIG. 3, showing a cross section along a plane containing the axial direction XX' of said element.

The body of the molding element 30 of FIG. 3 is composed of a molding part 31 formed by a wire 32 situated in the extension of a cylindrical part of axis XX' constituting the head 33 of said molding element.

In addition, the molding element 30 contains a third part in the shape of a cylinder of the same axis XX' as that of the head of said molding element, said third part forming the base 34 of said element inside which the head 33 of the molding element is introduced moving in rotation about XX'.

The presence of a rib 37 around the head 33 of the molding element combined with the presence of a groove 38 in the wall opposite the base 34 makes possible the rotation of said head relative to said base, while retaining the assembly. To facilitate mounting of the head 33 inside its base 34, it can be arranged to form at least two cuts 36' in the head 33 and in a direction identical to XX'.

Other means of mounting and fastening can, of course, be employed and, in particular, means making possible either a change of base or a change of molding element.

To conclude, the mounting of such a molding element of a body mounted in a base is carried out by placing said base in a seat provided inside a mold member. The advantage of such an arrangement is to make possible the fine adjustment of play between the rotating moving parts (in this case, between the base and the head) and to reduce wear of the mold in contact with the rotating moving parts.

A shoulder 39 provided on the base opposite the molding part is intended to cooperate with means, not represented, of connection in the main direction XX' of the molding element, in order to prevent said element from coming out of its seat in the mold during mold stripping.

In this variant molding element, it is advantageous to use means reducing the coefficient of friction between the base and the head, by providing for the presence of a bearing arranged, for example, on a conical bearing 35 of axis XX' provided between the base 34 and the molding element 30.

FIG. 4 shows a cross section, along a plane containing the axial direction, of another embodiment of the molding element 40 according to the invention.

The molding element 40 represented is comparable to that of FIG. 3 in that it contains a molding part formed by a wire 41 spirally wound around direction XX' and by a head 42 in the shape of a hollow cylinder, said head being inserted in a cylindrical base 46.

To facilitate mold stripping even more, particularly in case of use of wire/blade of complex geometry, it is advantageous to arrange for the molding element to be driven in both a rotary motion and a translational motion (for example, by synchronizing the two motions). For that purpose, it is proposed that the wall surface 43 radially outside the cylinder forming the head 42 be provided with a groove 44 having a helical track in the opposite direction from the helix formed by the wire 41 of the molding part; also provided is at least one rod 45 crossing the base 46 to cooperate with the groove 44 formed on the head. In this way, under the action of the forces exerted by the rubber at the time of mold stripping, it is possible to control and adjust rotation of the molding part; furthermore, the rod 45 makes it possible to lock the rotating molding element in order to set the position of said molding element correctly before molding.

After mold stripping, the molding element represented in FIG. 4 adopts the geometry shown in FIG. 5, according to which the head 42 of the molding element is partially out of its base 46. In addition, it is wise to provide elastic return means for bringing the molding element 40 back to its molding position, in order to reproduce the same cutting configuration identically on all the tires molded with said molding element.

Figure 6:
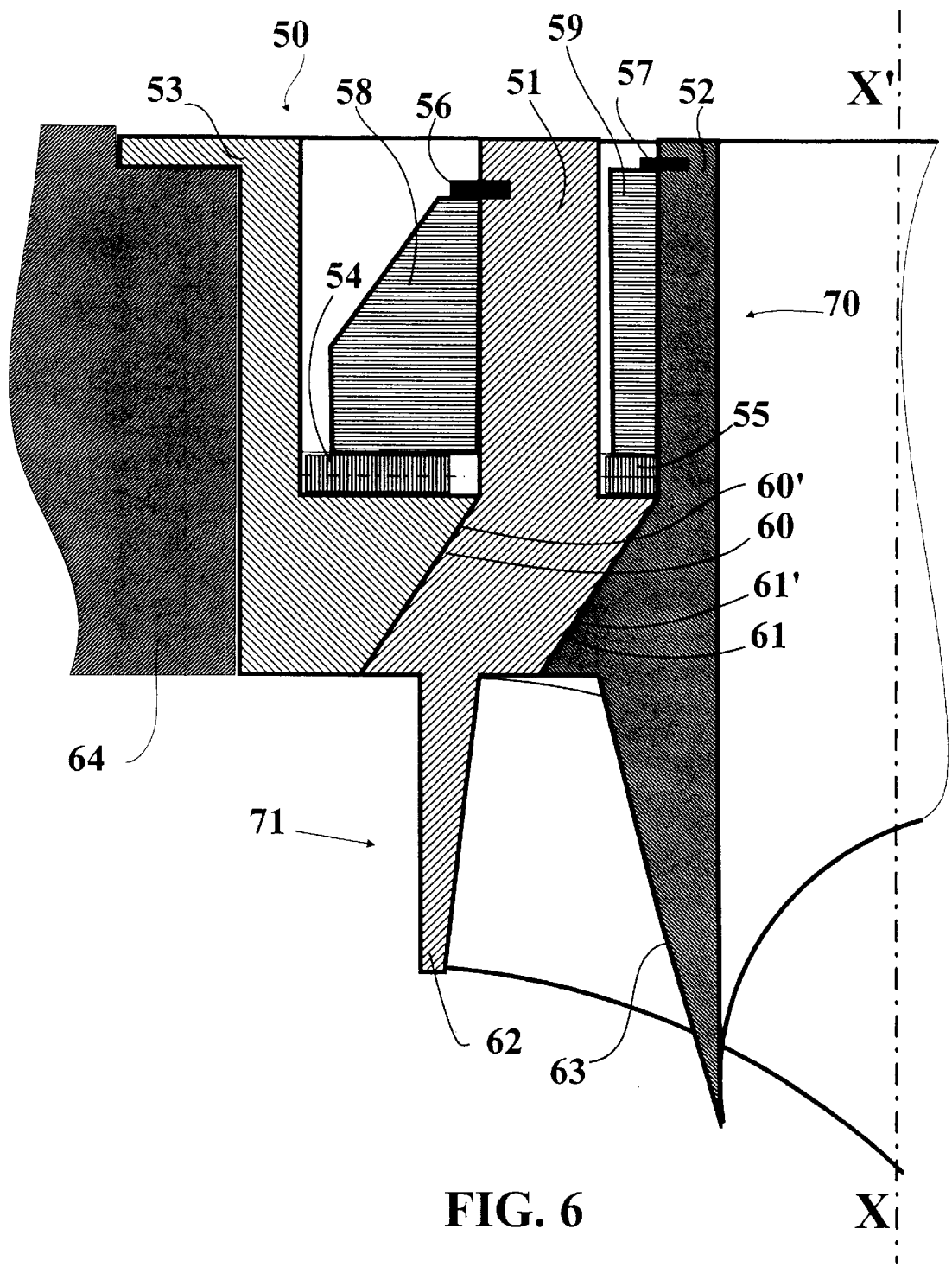
FIG. 6 shows a section of a variant of a molding element according to the invention, formed by two concentric cylinders rotatably mounted on a cylindrical base intended to be set in place in a tire mold.

Another embodiment of the molding element according to the invention is represented in FIG. 6. FIG. 6 shows a section along a plane containing the axis XX' of the molding element of a variant molding element 50 intended to mold two cuts concentric to each other, each cut being helix-shaped.

The molding element 50 comprises:

a generally cylinder-shaped base 53 of axis XX' intended to be mounted in a seat made in a tire mold member 64;

a head formed by a first cylinder 51 and a second cylinder 52, each of said cylinders being respectively extended by wires 62, 63 to form the molding part of said element. The two cylinders 51, 52 contain conical bearings 61, 61' intended to be in contact and to permit rotation on the axis XX' of said cylinders relative to each other.

The molding element is assembled before mounting in a seat provided on a mold member in the manner represented in FIG. 6. Conical bearings 60, 60' are provided on the base 53 and on the wall radially within the radially innermost first cylinder 51 in order to come in contact with each other and permit rotation of the first cylinder relative to said base.

Further provided are means of locking 56, 58, 54 the assembly of the first cylinder with the base and means of locking 57, 59, 55 the assembly of the first cylinder with the second cylinder 52, in order to form the molding element, so as to maintain the assembly of said cylinder with said base, while permitting free rotation of said cylinders on XX'.

The wire 62 of the first cylinder 51 advantageously follows a geometric profile along a helix having an angle of sign opposite that of the angle of the helix formed by the wire 63 of the second cylinder 52 concentric to the first, so as to produce rotations of said cylinders in opposite directions during at least the mold stripping phase.

In the latter case, it can also be advantageous to arrange for the wire comprising the molding part of the first cylinder to be in sliding contact on the wires of the molding part of the second cylinder, so as to form a kind of mesh molding a single cut and delimiting a plurality of openings intended to let the rubber compound through during molding in order to form connecting bridges between the opposite walls of said cut.

The same arrangements can be applied in case at least one cylinder bears several wires, all forming helices parallel to each other; the molding part of a molding element according to the invention can contain more than two cylinders.

In all the variants presented, it can be advantageous to arrange for each wire of the molding part to present a cross section whose area decreases from its end fastened to the head of the molding element to the opposite end of said molding part in order to facilitate the extraction of said wires out of the tread after molding.

It can also be arranged to provide each wire of the molding element with a coating appreciably reducing the forces necessary for mold stripping.

We claim:

1. A mold member for molding a part of a tire tread, said mold member being movable in a molding/mold stripping direction and comprising a molding surface for molding a surface of said tread, a seat provided in the mold member and at least one molding element for molding at least one incision in said tread, said molding element having two connected parts, a first part forming the molding part of the molding element and projecting on the molding surface in order to mold a cut in the tire and a second part rotatable about an axis XX' identical or close to the molding/mold stripping direction and intended to be mounted in the seat provided in the mold member, said mold member being characterized in that it is provided with means of mounting the second part of the molding element in the seat provided in the mold, said mounting means allowing rotation of the molding element on its axis XX' during at least the mold stripping phase.

2. A mold member according to claim 1, in which the means of mounting the molding element on said mold member comprise a cylindrical base that can be set in place in the seat provided in the mold, the second part of the molding element being mounted in free rotation on said base.

3. A mold member according to claim 1, in which the seat, provided to receive a molding element that can turn on its axis XX', is extended inside said mold so as to allow movement of the molding element in the direction of that extension and further comprising means for moving the molding element in said seat in direction XX'.

4. A mold member according to claim 3, in which the means provided for moving the molding element in direction XX' inside its seat also make possible a rotary motion of said element, the rotary motion being synchronous with the translational motion in the seat.

5. A molding element arranged to be installed on a mold member for molding a tread, said mold member being intended to make at least one incision in said tread, and said mold member being capable of being driven in a molding and/or mold stripping motion in a predetermined direction, the molding element comprising:

a body equipped with a head extended by a molding part, said molding part being intended to project from the molding surface of the mold member in order to mold at least one cut in a rubber compound tread, the head having at least one circular cylinder of axis XX' defining the main axis of the molding element, and means of mounting said molding element in the mold member, said means cooperating with said member in order to permit a rotation of the head about XX' relative to the mold, when the molding part of the molding element is subjected either to a force acting in direction XX' or to a torque about the same direction XX', while ensuring retaining of the molding element in direction XX'.

6. A molding element according to claim 5, in which the means of mounting and fastening said molding element on the mold member comprise a cylinder-shaped base concentric to the head of the molding element, said base being intended to be installed and retained in rotation in a seat provided in the mold member bearing said molding element and being designed to cooperate with the head of the molding element in order to permit the rotation of said head relative to said base.

7. A molding element according to claim 5 in which the molding part of said element comprises at least one molding wire fasten to the head of said element at one of its ends and extending in a direction forming at least locally a nonzero angle with direction XX', so that, under the action of contact of the rubber compound on said wire during mold stripping, the body of the molding element is driven in rotation on axis XX' relative to the base, its retention by the mold member facilitating said mold stripping.

8. A molding element according to claim 7, characterized in that at least one wire of the molding part forms a helix around XX'.

9. A molding element according to claim 8, in which the molding part contains a plurality of wires arranged generally parallel to one another, each of said wires forming a helix.

10. A molding element according to claim 8, in which the helix described by a wire extends from a truncated cone shape whose base of narrowest diameter is situated as close as possible to the head of said element.

11. A molding element according to claim 10, in which the angle of the truncated cone ranges between 0° and 20°.

12. A molding element according to claim 5 in which the head of said molding element comprises at least two concentric cylinders of the same axis XX', each cylinder bearing molding wires, means further being provided to ensure the connection of the cylinders to each other in direction XX', while permitting a rotation on axis XX' of said cylinders relative to each other.

13. A molding element according to claim 12, in which the wires of one of the cylinders follow a geometric profile along a helix having an angle of sign opposite that of the angle of the helix formed by the wires of the concentric cylinder, so as to produce rotations of said cylinders of opposite direction during at least the mold stripping phase.

14. A molding element according to claim 12, the body of the molding element includes two concentric cylinders of axis XX', each cylinder bearing at least one helix-wound wire, each wire borne by the radially outermost cylinder being in sliding contact on each wire borne by the inner cylinder and forming a helix having an angle of sign opposite that of the angle of the helix described by each wire borne by the innermost cylinder, so as to form a mesh defining openings through which the rubber compound can pass to form connecting bridges during molding.

15. A molding element according to claim 7 in which the area of the cross-section of the wire decreases from the end of the wire fastened to the head to the opposite end of the molding element.

16. A molding element according to claim 5, in which the molding element to the mold has a base in the shape of a hollow cylinder of axis XX', inside which the head of said molding element is installed, said head being provided on its outer surface with a groove cooperating with an element in relief projecting on the inside of the cylinder forming the base, so as to allow a rotation of said head relative to the base.

17. A molding element according to claim 16, in which the groove provided on the outer surface of the head of the molding element has, at least in part, a helix-shaped geometry of axis XX' and including an element in relief projecting on the inside of the base and cooperating with the groove in order to allow at the same time a rotary motion and a translational motion of the body of the molding element relative to the base when said body is subjected to a force along its axis XX'.

18. A molding element according to claim 5, including means for reducing the frictional forces and facilitating the rotary motion of the body of said element relative to its base.

19. A molding element as set forth in claim 18 in which said means for reducing the frictional forces is a ball bearing.

* * * * *